UNITED STATES PATENT OFFICE.

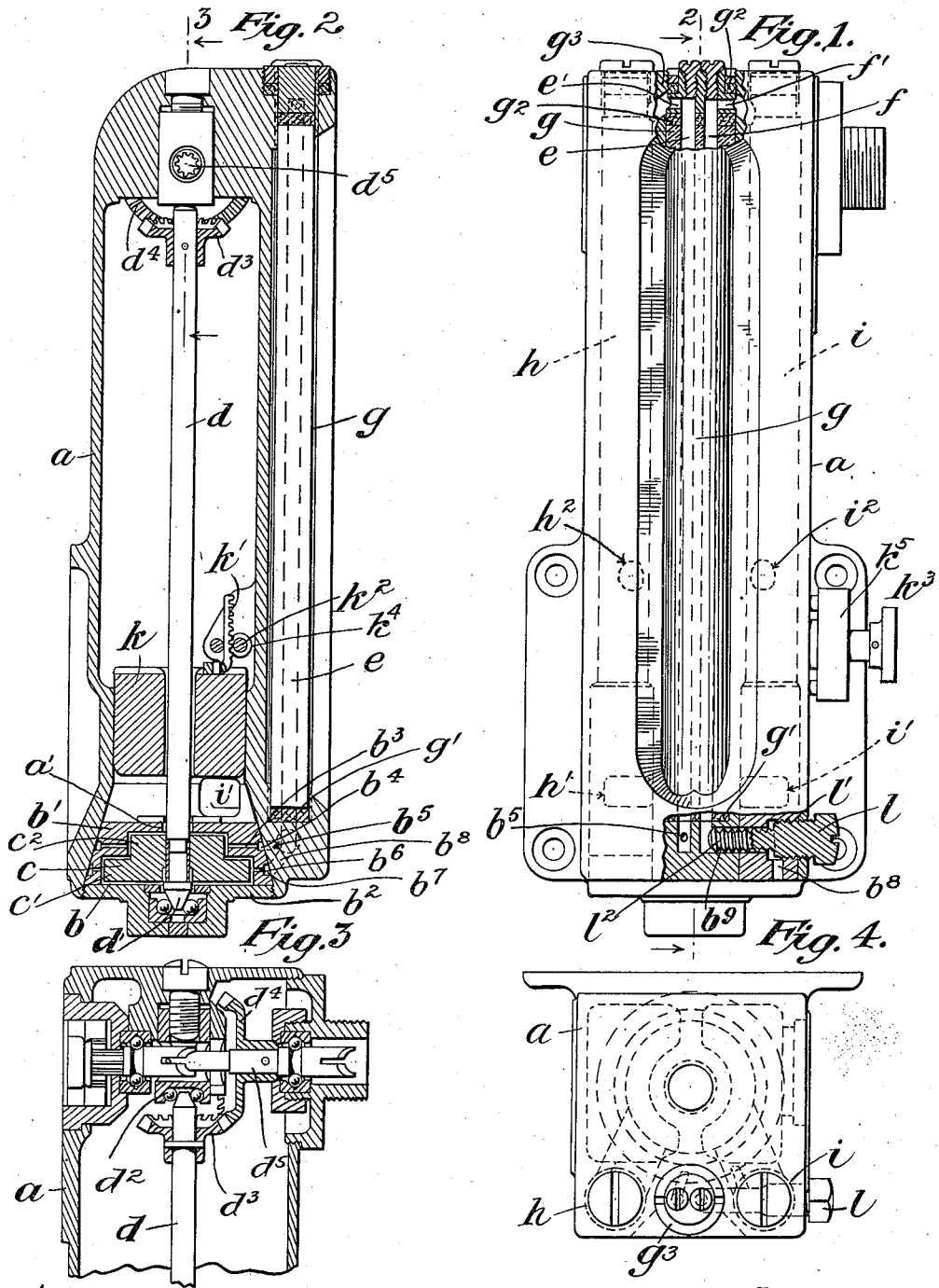

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

TACHOMETER.

1,015,767. Specification of Letters Patent. Patented Jan. 23, 1912.

Application filed May 1, 1911. Serial No. 624,439.

*To all whom it may concern:*

Be it known that I, CURTIS HUSSEY VEEDER, a citizen of the United States, residing in the city of Hartford, in the State of Connecticut, have invented certain new and useful Improvements in Tachometers, of which the following is a specification, reference being had to the accompanying drawings, forming a part hereof.

In another application, Serial No. 616,773, filed March 24, 1911, there is shown and described a tachometer in which the impeller which acts upon a column of liquid to indicate speed by the height thereof comprises one part of relatively large diameter which acts upon the liquid at relatively low speeds and another part of relatively small diameter which acts upon the liquid at relatively high speeds, while both parts alike control the height of the liquid in a single indicator tube which is common to both, the reading for low speed being taken from a scale at one side of the tube while the readings for high speed are taken from a scale at the other side of the tube.

The present invention has for its object to provide a 2-speed tachometer in which there is one indicator tube for low speed and another indicator tube for high speed, suitable connections being made whereby the flow of the liquid is properly controlled under different conditions.

The invention will be more fully explained hereinafter with reference to the accompanying drawing in which it is illustrated and in which—

Figure 1 is a view in front elevation of a tachometer constructed in accordance with the invention, some parts being broken away to show details of construction. Fig. 2 is a view in vertical central section on the plane indicated by the line 2—2 of Fig. 1. Fig. 3 is a partial detail view in section on the plane indicated by the broken line 3—3 of Fig. 2. Fig. 4 is a top view with some of the parts omitted.

The tachometer shown in the drawing comprises a main casing or reservoir $a$ at the lower end of which and connecting therewith through an enlarged central aperture $a'$ around the pump shaft hereinafter referred to is a pump chamber $b$, which may be formed conveniently in a block $b'$ fitted in the conical lower end of the main reservoir and held in place by a threaded cap $b^2$. In the pump chamber $b$ is placed a paddle wheel $c$, which has one part $c'$ of relatively large diameter and another part $c^2$ of relatively small diameter. The paddle wheel is mounted upon the lower end of a vertical shaft $d$, which has a suitable step bearing $d'$ at its lower end in the cap $b^2$ and a suitable bearing $d^2$ at its upper end. A bevel pinion $d^3$ at the upper end of the shaft $d$ is engaged by a bevel gear $d^4$ on the driving shaft $d^5$ with which suitable connection is made from the shaft or other moving part of the machine, the speed of which is to be indicated.

The pump chamber $b$ conforms to the paddle wheel $c$ and its upper or smaller part communicates, preferably through radial ducts $b^3$ and a common circumferential duct $b^4$ and a duct $b^5$, with the high speed indicator tube $e$ while the larger part of the pump chamber similarly communicates, preferably through radial ducts $b^6$, a common circumferential duct $b^7$ and a duct $b^8$, $b^9$ with a low speed indicator tube $f$.

The high speed and low speed indicator tubes $e$ and $f$ are shown in the drawing as formed in a glass body $g$ which is seated at its lower end upon a yielding seat $g'$ and bears at its upper end against a gasket $g^2$ which is compressed against the end of the tube by a screw cap $g^3$ threaded in the upper end of the casing. At its upper end the indicator tube $e$ communicates through a suitable duct $e'$ with a corresponding return tube $h$ which in turn communicates with the main reservoir $a$ through a port $h'$ at its lower end. In like manner tube $f$ communicates through a suitable duct $f'$ with a corresponding return tube $i$ which in turn communicates with the main reservoir $a$ through a port $i'$ at its lower end. Communication between the return tubes and the main reservoir or chamber is also established as at $h^2$ and $i^2$ well above the level of the liquid in the main reservoir in order to equalize the air pressure.

As is usual in instruments of this character, a displacement plunger $k$ is provided in the main reservoir to regulate the height of the liquid, such plunger being shown in the present instance as operated through a rack $k'$ secured to the plunger and engaged by a pinion, $k^4$, on a shaft $k^2$ which extends through a suitable stuffing box $k^5$ and is provided externally with an operating knob $k^3$.

It is desirable to provide a device for choking the overflow of liquid from the low speed indicator tube when the liquid is forced to the top thereof at the maximum of the low speed. Such a choking device might be placed in different locations but it is found desirable to locate it as shown in the drawing, that is to say, between the pump and the low speed indicator tube. Any suitable choking device might be employed but for convenience in manufacture and also for convenience in cleaning the form of choking device shown is found satisfactory, such device consisting of a plug $l$ which is threaded at $l'$ in the wall of the casing and has a threaded portion $l^2$ in the duct $b^9$ between the pump and the indicator tube. The thread of the portion $l^2$ forms a long, small tube through the casing to retard the flow of the liquid as the speed increases.

The mode of operation of the improved tachometer is substantially the same as that of other tachometers of this general type, it being understood that at comparatively low speeds the reading is taken from the low speed indicator and that at higher speeds, the low speed indicator tube being then filled with liquid (excessive flow being prevented by the choking device), the reading is taken from the high speed indicator tube in which the height of the liquid is dependent upon the speed of rotation of the high speed or low diameter portion of the impeller or pump.

No manipulation of the instrument is required when the speed is changed from relatively low speed to relatively high speed, as would be the case with a single tube indicator coöperating with a 2-speed impeller.

It will be understood that various changes in details of construction and arrangement may be made to suit different conditions of use and that the invention is not restricted to the particular construction shown and described herein.

I claim as my invention:

1. In an instrument of the character described, the combination of a common reservoir, a pump comprising a high speed part and a low speed part both communicating with said reservoir, two indicator tubes for high and low speeds respectively and means affording passages whereby said tubes are placed in communication with said pump parts respectively.

2. In an instrument of the character described, the combination of a common reservoir, a pump comprising a high speed part and a low speed part both communicating with said reservoir, two indicator tubes for high and low speeds respectively, means affording passages whereby said tubes are placed in communication with said pump parts respectively, means affording passages whereby said tubes are placed in communication with the reservoir, and a choking device to prevent excessive overflow from the low speed indicator tube.

3. In an instrument of the character described, the combination of a common reservoir, a pump comprising a high speed part and a low speed part both communicating with said reservoir, and having an impeller with a high speed part and a low speed part, two indicator tubes for high and low speeds respectively, and means affording passages whereby said tubes are placed in communication with said pump parts respectively and with the reservoir.

4. In an instrument of the character described, the combination of a common reservoir, a pump comprising a high speed part and a low speed part both communicating with said reservoir and having an impeller with a high speed part and a low speed part, two indicator tubes for high and low speeds respectively, means affording passages whereby said tubes are placed in communication with said pump parts respectively and with the main reservoir, and a choking device interposed in the passage between the low speed part of the pump and the corresponding indicator tube to prevent excessive overflow.

5. In an instrument of the character described, the combination of a common reservoir, a pump comprising a high speed part and a low speed part both communicating with said reservoir and having an impeller with a high speed part and a low speed part, two indicator tubes for high and low speeds respectively, means affording passages whereby said tubes are placed in communication with said pump parts respectively and with the reservoir, and a choking device interposed in the low speed part of the pump and the corresponding indicator tube to prevent excessive overflow, said choking device comprising a threaded plug inserted in the duct between the pump and the indicator tube.

This specification signed and witnessed this 27th day of April A. D., 1911.

CURTIS HUSSEY VEEDER.

Signed in the presence of—
AMASA TROWBRIDGE,
E. BARRIE SMITH.

---

Copies of this patent may be obtained for five cents each, by addressing the "Commissioner of Patents, Washington, D. C."